United States Patent [19]

Urban

[11] Patent Number: 4,516,308
[45] Date of Patent: May 14, 1985

[54] PORTABLE WORKSHOP

[76] Inventor: John A. Urban, 423 S. Woodlawn, Wheaton, Ill. 60187

[21] Appl. No.: 486,215

[22] Filed: Apr. 18, 1983

[51] Int. Cl.³ ............................................. B23Q 39/06
[52] U.S. Cl. ...................................... 29/564; 29/560; 29/650; 228/45; 228/57; 296/24 R
[58] Field of Search ...................... 296/24 R, 26, 26 R, 296/165, 181, 182, 196, 197, 204; 144/285, 1 R; 280/DIG. 8; 83/928; 29/650, 564, 564.1, 564.2, 26 B, 560, 50; 228/45, 57

[56] References Cited

U.S. PATENT DOCUMENTS

| | | | |
|---|---|---|---|
| 2,811,111 | 10/1957 | Levitz et al. | 296/24 R |
| 3,317,219 | 5/1967 | Hindin et al. | 280/DIG. 8 |
| 3,321,214 | 5/1967 | Tantlinger | 280/DIG. 8 |
| 3,633,970 | 1/1972 | Langhals | 296/24 R |
| 4,055,206 | 10/1977 | Griffin | 144/285 |
| 4,133,572 | 1/1979 | Robbins et al. | 296/24 R |

*Primary Examiner*—William R. Briggs
*Assistant Examiner*—Glenn L. Webb
*Attorney, Agent, or Firm*—McWilliams, Mann, Zummer & Sweeney

[57] ABSTRACT

The invention relates to a portable workshop having various facilities for performing precision machine work at a work site and which includes a mobile trailer having first and second sections with transport wheel and suspension assemblies and a trailer hitch whereby the trailer may be easily towed from one work site to another. One section is separable from the other and the transport wheels remain with one platform while smaller wheels are provided on the other platform with elevating mechanism to lower the platform onto the smaller wheels. One platform may have equipment such as a welder which might be separated and used on one location at the job site while the other section has various tools, including a crane and a container for storing the tools, which might be moved to and utilized at another location at the site.

8 Claims, 5 Drawing Figures

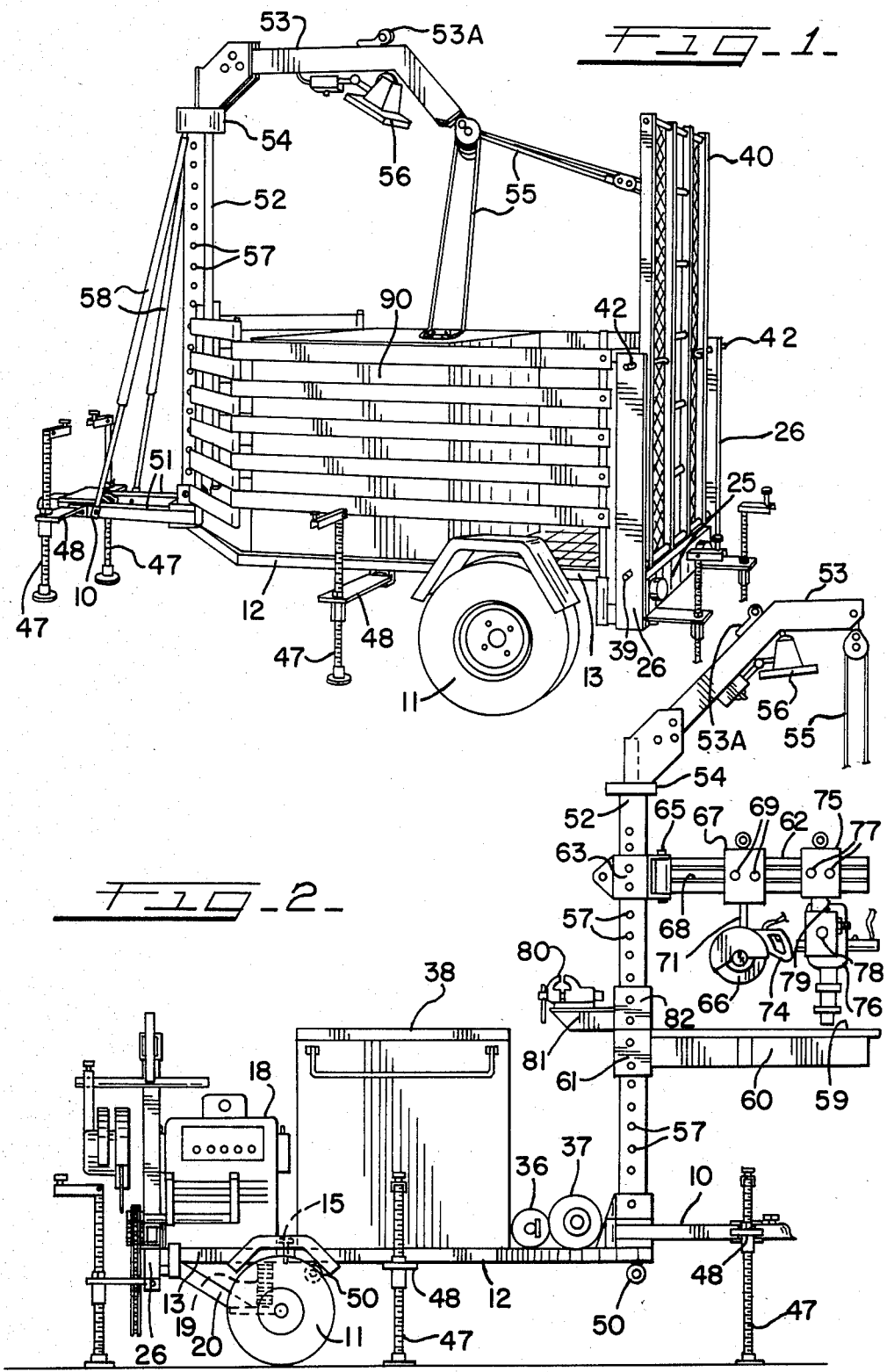

PORTABLE WORKSHOP

BACKGROUND OF THE INVENTION

Field of the Invention

Portable tool facilities have been available heretofore such as portable welder units, portable units for performing specific functions such as sawing, or drilling and digging devices and some prior facilities included a transport trailer for hauling tools to a job but none of these prior devices provided a separable trailer whereby one trailer portion might be located at one area at a site for performing a particular function while the other trailer portion equipped with various tools might be moved to another location to perform any of various jobs. Some of these prior devices are best exemplified in the following patents including U.S. Pat. No. 2,505,658 which is for a combined workbench, cabinet and tool support. This disclosure relates to a unitary assembly where all of the facilities are present at all times regardless of where the unit is moved to on the casters provided. There is no provision for separability of any portion of the unit, or of any facility.

U.S. Pat. No. 3,633,970 is for a welding truck and while this welding equipment is portable with the truck, it is fixed thereto and must move with the truck vehicle at all times and no provision is made for leaving the welder apart from the truck at any separate location.

U.S. Pat. No. 4,055,206 relates to a composite shop trailer which is foldable for transport and expandable at a work site, but all of the tool equipment included in the trailer is permanently attached and cannot be moved away from the trailer, but must be utilized as a part of the trailer so that the assembly is unitary and allows for no separability.

U.S. Pat. No. 4,133,562 discloses a utility trailer which is foldable and retractable and has various tools and equipment adapted to be driven by a power take-off unit on a towing vehicle so that the trailer as a tool source is not self-contained.

U.S. Pat. No. 4,230,358 is for a highly autonomous cross-country workshop and servicing van that includes an electric generating set that is removably mounted on skis fixed by bolts and nuts since the unit is intended for desert operation as a breakdown station for automotive vehicles. The generator set is connected to the van by power transfer lines and pipes so that the electric equipment is not entirely separate from the van.

SUMMARY OF THE INVENTION

This invention covers a tool shop that not only is portable but is separable into individual units for performing a function at one work site and enabling the other unit to be moved to another work site to perform any of several precision jobs requiring the use of specific tools. The portable unit comprises a trailer vehicle that includes a first platform section and a second platform section separably connected together whereby the respective sections may be moved and operated independently of the other. The first platform is provided with a container for storing all of the tools adapted to operate with that section and the second platform is provided with an engine-driven generator unit and welder whereby this welding equipment may be located at one work site while the first platform and tool equipment may be moved on to another work site.

A vertically-extending support column is mounted on the first platform with a fully-revolvable crane which is connected atop the column. This column also is designed to support a vertically-adjustable, horizontally-extending worktable and a vertically-adjustable tool-mounting arm that extends horizontally from the column over the worktable and is adapted to support various power tools adjustably positionable along the arm.

Transport wheel and suspension assemblies are operably mounted to the second platform and a trailer hitch is mounted to the first platform so that the joined platform sections may be hauled as a unit by a towing vehicle. When the second platform is detached from the first for independent use of the welding equipment, the supporting wheel assemblies stay with this platform, which is supported also by levelers at the end away from the wheels. The first platform also is equipped with stabilizing means and levelers which are adapted to lower this platform onto wheels of a smaller size than the transport wheels when the machine tools on this platform are to be used independently.

DESCRIPTION OF THE DRAWINGS

The foregoing improvements and purposes of the invention are attained by the structure and arrangement illustrated in the accompanying drawings, wherein:

FIG. 1 is a three-quarter side elevational view of this portable workshop fully assembled and ready for transport to a work site;

FIG. 2 is a side elevational view of the portable workshop with all of the work equipment thereon and before the two sections are separated for work at different locations;

DESCRIPTION OF PREFERRED EMBODIMENT

Figure 3:
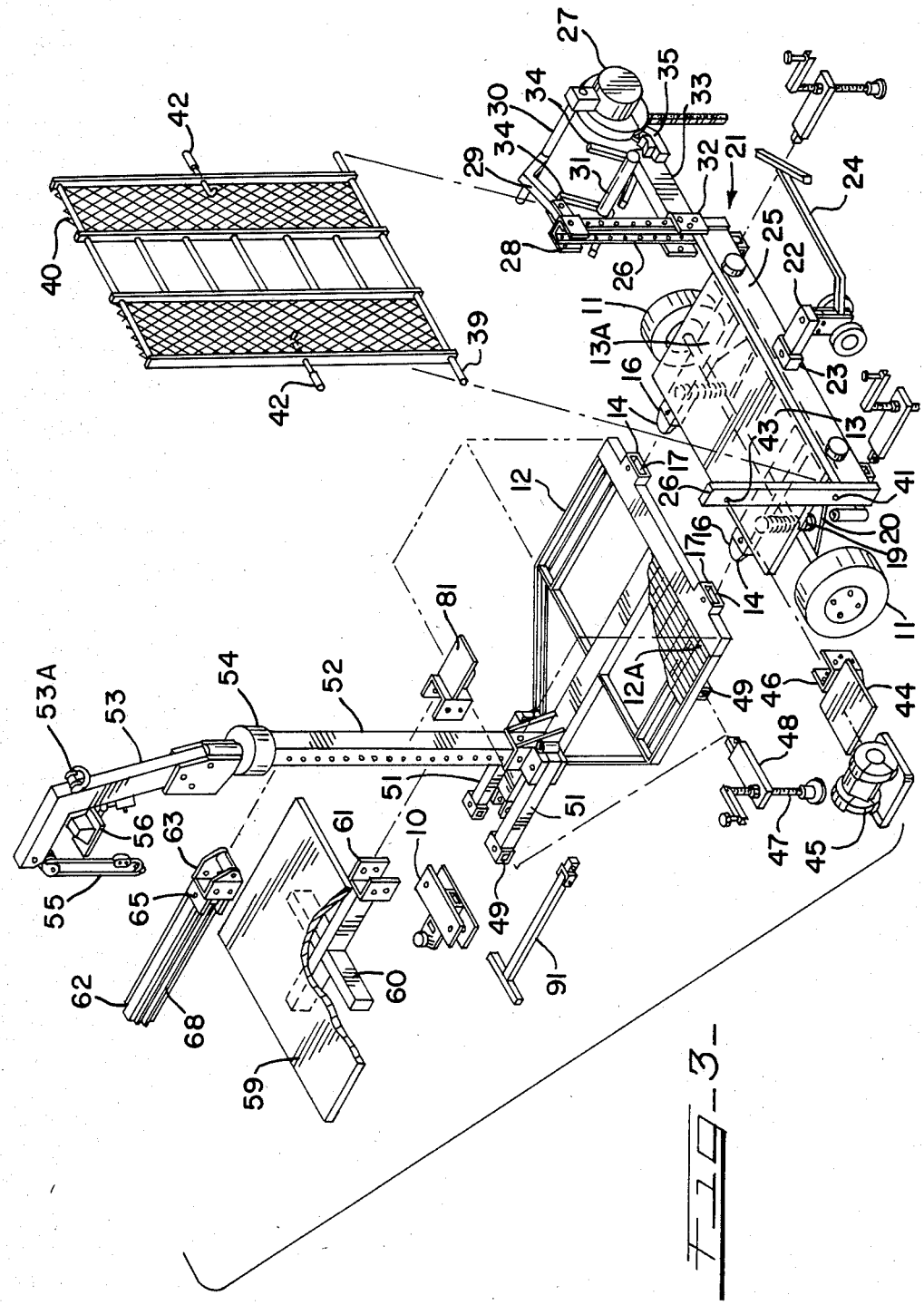
FIG. 3 is an exploded general perspective view of the portable workshop.

This portable workshop facilitates precision machine work at selected work sites and the welder and generating equipment can be left outside while the tool container platform may be moved indoors for performing the precision work. As shown in the drawings, the combined trailer is best illustrated as a whole in FIG. 1, where it will be seen the assembled vehicle is adapted to be towed as a unit with the hitch 10 adapted to be connected to a towing truck, or other vehicle and with the connected sections riding on transport wheels 11. The combined trailer includes a first section 12 and a second section 13 which are adapted to be connected together, as best indicated in FIG. 3, by couplings 14 interengaged and secured by removable pins 15 (see FIG. 2). Section 12 on its upper surface defines a platform 12A, and section 13 a platform 13A.

The couplings 14 each comprise a coupler shank 16 projecting from one platform and a socket 17 on the other platform. The shanks 16 are entered into the sockets 17 and secured by the pins 15 which pass through the sockets and the coupler shanks. As shown, the coupler shanks are on the section 13 containing the engine generator welder setup 18. The couplings afford a simple and easy means of separating the sections 12 and 13 whereby the two parts can be utilized independently, as necessary. The transport wheels 11 are mounted on the section 13 with suitable springs 19 and suspension parts 20, so that when the sections are separated, this unit is supported on these wheels and on a pair of removable levelers 21 which support that end of the section opposite the end having the wheels 11.

A removable trolley 22 is adapted to be inserted into a socket mounting 23 at the leveler end of the section 13 whereby the platform with its welding equipment may be readily moved about by means of a tongue 24. The socket 23 is disposed in an end sill member 25 forming a structural part of the section 13 and the levelers 21 are also removably mounted into sockets in this end sill member. Rigid corner posts 26 are structurally secured to the end sill and extend upwardly therefrom. One or both of these vertical corner posts may be provided with vertically-spaced openings at regular intervals, as best shown in FIG. 3, for the purpose of mounting certain power tools as also shown in this figure.

A chop saw 27 is illustrated in FIG. 3 as being mounted on a corner post 26 by means of a bracket 28 that is vertically adjustable on the post by means of the vertically-spaced openings. A saw-supporting arm 29 is pivotally mounted on the bracket and enables the saw to be moved up and down about the pivot and the cross bar 30 enables the saw to be adjustably positioned laterally. A stand 31 for supporting steel pieces such as metal pipes in relation to the saw is also mounted on the corner post below the saw 27. A bracket 32 mounts in the post holes for vertical adjustment and has an outwardly-extending arm 33 supporting the stand 31 which has spaced arms 34 in the shape of a V, which act to cradle a pipe for operation by the saw. A chain-type vise 35 mounted adjacent the base of the V, enables a log to be clamped in position in the stand 31 for sawing operations.

The welding equipment 18 comprises an arc welder and generating unit, but this portable workshop is equipped to do gas welding also and for this purpose acetylene and oxygen tanks 36 and 37 are provided as indicated in FIG. 2 for use with a torch, not shown. A storage box 38 is provided to house all of the various tool attachments and the worktable which are to be described later. The welding equipment and engine generator, the gas tanks, and the tool storage box 38 may be loaded onto the assembled trailer by means of a crane or by a ramp 40 which acts as a tailgate between the corner posts 26 when it is disposed in its upright position as best shown in FIG. 1. The ramp 40 also can function as a work table when supported on legs at one end and by the trailer frame at the other end. The tailgate is less than the full width between the corner posts, but has a bottom pivot bar 39 of greater length than the width of the gate and which can be maneuvered into the pivot openings 41 in the corner posts because of this relative difference in the width of the gate and the space between the posts.

The ramp 40 can be pivoted about the bar 39 to a lowered position inclined to the ground so that heavy items can be moved readily up and down the ramp on and off the trailer without difficulty. The ramp might also be used as a bridge from the trailer workshop to another vehicle or to a platform. Slidable locking bars 42 engage lock holes 43 in the corner posts when the ramp 40 is raised to its vertical position for travel. Other mounting arrangements can be provided so as to make the height of the pivot bar 39 adjustable. Other power tools are adapted to be mounted on the corner posts 26 such as a grinder 45 which is applied in a mount 44 having a bracket 46 adapted to embrace and be secured to a corner post in the same manner as the saw 27 including the brackets 28 and 32. The grinder mount includes a shelf 44 upon which the grinder 45 is disposed and which might be useful in grinding welds as well as other tool-grinding operations.

The sections 12 and 13, when secured together by means of the couplings 14, function as a single vehicle adapted to be towed by means of the hitch connection 10 behind a towing vehicle such as a pick-up or other form of truck and with the entire assembled vehicle riding on the transport wheels 11. The section 12 includes a number of tool facilities and a storage container, or tool box 38 in which the tools are intended to be stored when not in use. The gas tanks 36 and 37 are also carried on this platform section, as indicated in FIG. 2.

In order to support the section 12, when separated from the section 13, a plurality of stabilizing means in the form of levelers 47 are provided which are detachably secured to the section by means of projecting brackets 48 adapted to be secured in the associated socket 49 (see FIG. 3) on the section and the hitch member bracket elements for the hitch 10. Illustrated are four levelers for supporting the section 12 at the same level as the section 13 when the pins 15 are extracted and the section 13 is drawn away. The section 12 is equipped with caster-type wheels 50 which are of relatively smaller diameter than the transport wheels 11 and when the section 13 has been drawn away the levelers 47 are adjustably operated to lower the section 12 onto the wheels 50 and the levelers 47 with the brackets 48 then being removed and stored in the container 38. The section 12 can now be moved around as necessary on the caster wheels 50 so that the unit can be brought directly to a location where precision work is to be done.

The hitch mounting 10 is connected to the pair of bracket arms 51 containing the sockets 49 for the elevators or levelers 47 and secured by a pin extending through each such arm. The separate hitch is best shown in FIG. 3. The bracket arms 51 for the hitch are mounted at the front end of the section 12 and extend forwardly to provide a properly related positioning and spacing when secured onto the ball-type hitch element of the towing truck vehicle. These brackets are secured to the platform structure at opposite sides of a vertically-extending support column 52 extending from the platform and which forms a means of attachment and support for any of several power tools as well as a workbench.

A crane 53 is mounted atop column 52 and is fully rotatable through 360° by means of the mounting 54 on the top end of the column. The crane may also be placed in a position, as shown in FIG. 1, when the trailer is being transported. The crane may be utilized to raise and lower the tailgate 40 as well as to lift the storage box 38 by means of the cable hoist, or tackle equipment 55, as indicated in FIG. 1, and can also be used to lift any other heavy object within its capacity, as required. A clevis hook 53A is shown connected atop the crane 53 to provide for lifting of the entire assembly when it is in the position shown in FIG. 1. A 500-watt lamp 56 is mounted on the underside of the crane for lighting the work areas when the portable workshop is on location. The column 52 is provided with regularly spaced openings 57 throughout its vertical extent for the positioning and fixing of various work elements on the column. As shown in FIG. 1, the support column 52 can be braced by guy rods 58 extending from adjacent the top of the column downwardly to the bracket arms 51 which is especially beneficial when the crane 53 is used to load items on or off the workshop platforms, as indicated in this figure.

Various tool mountings are adapted to interact with the column 52 and these several mountings are also adaptable to mounting on the corner posts 26 which are of the same width as the column and have similar hole spacing so that the grinder mount 44 as well as the saw-mounting brackets 28 and 32 may also be used on the column 52 as well as on the corner posts. A worktable 59 supported on a cruciform bracket 60 is adapted to be mounted on the column 52 by means of bracket 61 having holes of similar spacing with those through the column and when the table-supporting bracket is positioned on the column as desired, with the holes in registry, one or more pins may be inserted therethrough to render the worktable stationary. The holes in the bracket 61 may be spaced to register with two holes through the column whereby two mounting pins might be used to lend greater rigidity and stability to the worktable.

The vertical column 52 comprises a closed box section for maximum strength and resistance to bending moments and in addition to the worktable is adapted to support various tool installations for operation relative to the table on articles located on the work surface. A tool-mounting arm 62 is adapted to be mounted on the column by means of a bracket 63 secured by a pair of through pins. The support arm 62 is mounted in the bracket 63 for pivotal movement in a horizontal plane by means of a vertical pin 65 whereby the arm may be swung to various work positions to enable a tool carried thereby to be used in various positions relative to the worktable. The bracket 63 may be fitted with a roller shown at 64 in FIG. 4 to facilitate raising or lowering of the bracket when under load and to provide greater stability.

Various tools will now be described for mounting on the arm 62. It is this mounting arrangement which allows relatively inexpensive portable tools such as saws and drills to function in a machine shop environment to perform precision work as opposed to the rough work these tools would normally perform when used as portable hand tools.

Figure 4:
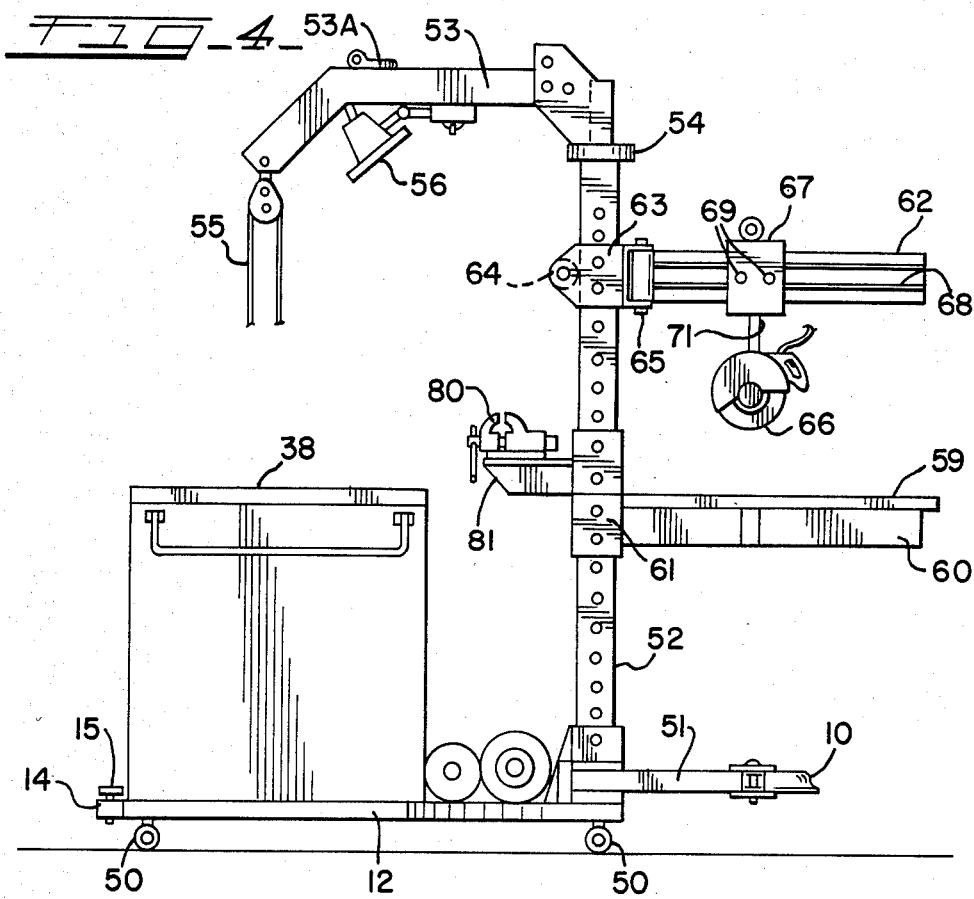
FIG. 4 is a side elevational view of the first section separated from the second section and having certain of the work equipment shown in place and with the section lowered onto its separate caster wheels for movement of this section independently.
Figure 5:
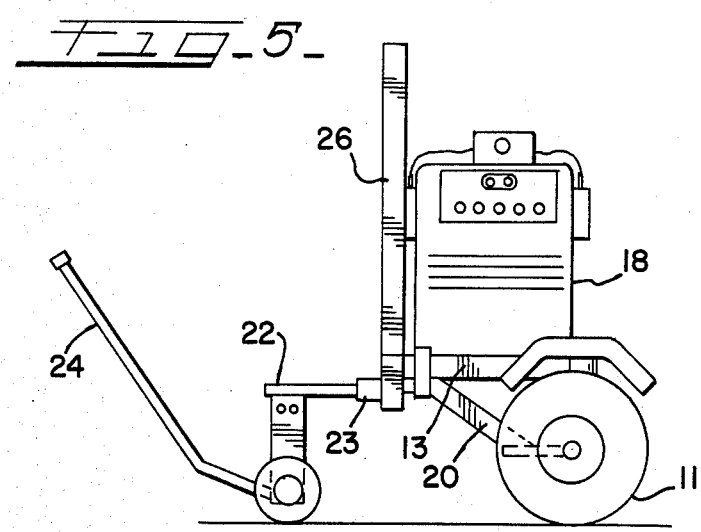
FIG. 5 is a side elevational view of the second section with the welding equipment and engine generator set thereon.

As shown in FIG. 4, a saw 66 is adapted to be suspended from the radial arm 62 through the medium of a slidable bracket 67 surrounding the arm. It will be noted that the arm has a recessed trackway 68 running lengthwise at each side and the bracket 67 has a pair of rollers 69 at each side adapted to operate in the respective trackways whereby the bracket may be moved quite easily along the length of the arm 62. The saw may be operated in a tilted position for making angles, or bevel cuts, and may be removably mounted so that it can be separated from the bracket for hand-held use where necessary.

A drill press mounting bracket assembly 75, shown in FIG. 2, is also provided for a standard type, hand-held power drill 76 to be suspended from the radial arm 62 in substantially similar manner to the mounting of the saw bracket 67. The bracket 75 fits over the arm 62 and has rollers 77 operative in the trackways 68 thus enabling the drill 76 to be moved back and forth on the arm and since the arm is pivotally mounted on the bracket 63, the drill becomes infinitely movable throughout the area embraced by the swinging arm. The bracket 75 has a depending bracket 78 fixed thereto by means of a vertical gear arrangement 79 for raising or lowering the drill. The drill 76 is secured to the bracket 78 by means of a chain, not shown, engaged around the drill housing and tightened to hold the drill in a fixed position rigid with the supporting bracket.

A vise attachment 80 is also provided for mounting preferably on the vertical column 52 by means of a bracket shelf 81 which is mounted on the column in the same manner as the previously described tools. The bracket 81 includes the shelf for the vise 80 and a column engaging open section 82 which embraces the column and has two pairs of aligned holes for the passage of mounting pins through the bracket flanges and the column to rigidly mount the vise. The vise, as shown, is disposed in the opposition direction from the worktable 59 and the radial arm 62 whereby it is disposed over the platform 13 so that it can be worked with from that area. The mounting arrangement is such that the position of the vise can be reversed so that it overlies the worktable 59 if it is desired to clamp or hold an object on the worktable.

The portable workshop platforms 12 and 13 when assembled may have stake-type side walls 90 removably mounted thereon to enclose all of the equipment loaded on the platforms. The assembled workshop may be pulled around manually by means of a tongue 91 (see FIG. 3) which may be removably entered into a socket receptacle therefor provided in the section 12 between the forwardly-extending arms 51. This tongue 91 may also be utilized to pull the section 12 around on the casters 50 when the sections are separated.

This workshop not only is entirely portable for movement to any work site but is fully equipped with portable tools mounted for precision work and capable of accomplishing just about any job that might be encountered at a construction site, or elsewhere.

It should be noted that this portable workshop is entirely self-contained and to this end, all of the tools are electrically driven with the current therefor being generated by the engine generator set mounted with the welding equipment 18 which delivers 111 V and 230 V current for use with tools as included herein.

Various features of the invention have been particularly shown and described in connection with the illustrated embodiments of the invention, however, it must be understood that these particular arrangements merely illustrate and that the invention is to be given its fullest interpretation within the terms of the appended claims.

What is claimed is:

1. A portable workshop for facilitating precision machine work at various job sites including a mobile trailer frame supported for easy transport to a job site including a first section, a second section, and means to removably connect said first and second sections; first wheel means connected to said first section for portable support thereof; second wheel means connected to said second section for portable support thereof; a vertically-extending support column connected to and supported by said first section of said trailer frame; a first platform associated with said first section of said trailer frame adapted to support a tool container thereon; a second platform associated with said second section of said trailer frame adapted to support welding equipment or the like, said section being easily detachable from said first section for removal therefrom at a job site; a mounting arm; means to connect said mounting arm to said vertical support at any of a number of predetermined heights; means to adjust said mounting arm from one height to another, said arm adapted to function as a mounting support for any of a number of power tools adapted to be adjustably positioned along and supported by said arm; and hitching means attached to said trailer frame to provide for connecting of said trailer frame to a towing vehicle.

2. A portable workshop as in claim 1 including a horizontally extending worktable connectable to said vertical support column at any of a number of predetermined heights, easily adjustable from one height to another and easily removable from said support column for storage.

3. A portable workshop as in claim 1 including a crane assembly mounted on said vertical support for raising or lowering articles at a job site.

4. A portable workshop as in claim 1 in which said second wheel means includes transport wheels and suspension assemblies mounted to said second section, said wheels and suspension supporting both said sections when connected for transport between job sites.

5. A portable workshop as in claim 4 wherein said wheels and suspension stay with the second platform when said first section is separated at a job site.

6. A portable workshop as in claim 5 wherein said first wheel means includes relatively smaller wheels supporting said first platform when separated from the second platform, and stabilizing means for supporting said first section when removed from said second section.

7. A portable workshop as in claim 5 wherein said second platform includes leveling devices spaced from said transport wheels.

8. A portable workshop as in claim 2 having one or more tools mountable on said arm for back-and-forth movements on the arm, said arm being pivotally mounted whereby the tool may be positioned at a wide variety of positions overlying said worktable.

* * * * *